(12) United States Patent
Afschrift et al.

(10) Patent No.: US 6,634,540 B1
(45) Date of Patent: Oct. 21, 2003

(54) METHOD AND DEVICE FOR WELDING ELONGATED ELEMENTS

(75) Inventors: Paul Afschrift, Wetteren (BE); Walter Soete, Ghent (BE)

(73) Assignee: Denys, Naamloze Vennootschap (BE)

( * ) Notice: Subject to any disclaimer, the term of this patent is extended or adjusted under 35 U.S.C. 154(b) by 0 days.

(21) Appl. No.: 09/926,667

(22) PCT Filed: May 31, 2000

(86) PCT No.: PCT/BE00/00058

§ 371 (c)(1),
(2), (4) Date: Mar. 29, 2002

(87) PCT Pub. No.: WO00/73012

PCT Pub. Date: Dec. 7, 2000

(30) Foreign Application Priority Data

Jun. 1, 1999 (BE) .............................................. 9900376

(51) Int. Cl.[7] ........................ B23K 20/12; B23K 31/02; B23K 37/00
(52) U.S. Cl. .................... 228/114.5; 228/175; 228/176; 228/2.3; 228/44.3
(58) Field of Search ........................... 228/112.1–114.5, 228/212, 2.1–2.3, 2.5, 175, 176; 219/44.3, 44.4

(56) References Cited

U.S. PATENT DOCUMENTS

| | | | | |
|---|---|---|---|---|
| 3,872,275 A | * | 3/1975 | Rudd | 219/617 |
| 4,063,676 A | * | 12/1977 | Lilly | 228/114 |
| 4,090,899 A | * | 5/1978 | Reich | 156/79 |
| 4,542,846 A | * | 9/1985 | Matsui et al. | 228/114.5 |
| 5,071,053 A | * | 12/1991 | Heijnen | 228/114.5 |
| 5,492,264 A | * | 2/1996 | Wadleigh | 228/112.1 |
| 6,142,360 A | * | 11/2000 | Hutt | 228/114.5 |

FOREIGN PATENT DOCUMENTS

| | | | | |
|---|---|---|---|---|
| EP | 0 396 204 A2 | * | 11/1990 | |
| FR | 2 048 907 A | * | 3/1971 | |
| FR | 138 386 A | * | 1/1973 | |
| SU | 616 093 A | * | 7/1978 | |
| SU | 721 283 A | * | 3/1980 | |

* cited by examiner

Primary Examiner—Tom Dunn
Assistant Examiner—Colleen P. Cooke
(74) Attorney, Agent, or Firm—Bacon & Thomas, PLLC

(57) ABSTRACT

The present invention concerns a method for welding the far ends of two elongated elements together, whereby the above-mentioned far ends are heated up to forging temperature by rotating a ring clamped between them. A flat ring is provided between the far ends, whereby these far ends are axially drawn towards one another and, as soon as the forging temperature is reached, the elements are pushed towards one another with great force by exerting a dynamic force. The device contains driving means to rotate the ring, drawing means to draw the elongated elements towards one another and means to exert a dynamic force.

19 Claims, 2 Drawing Sheets

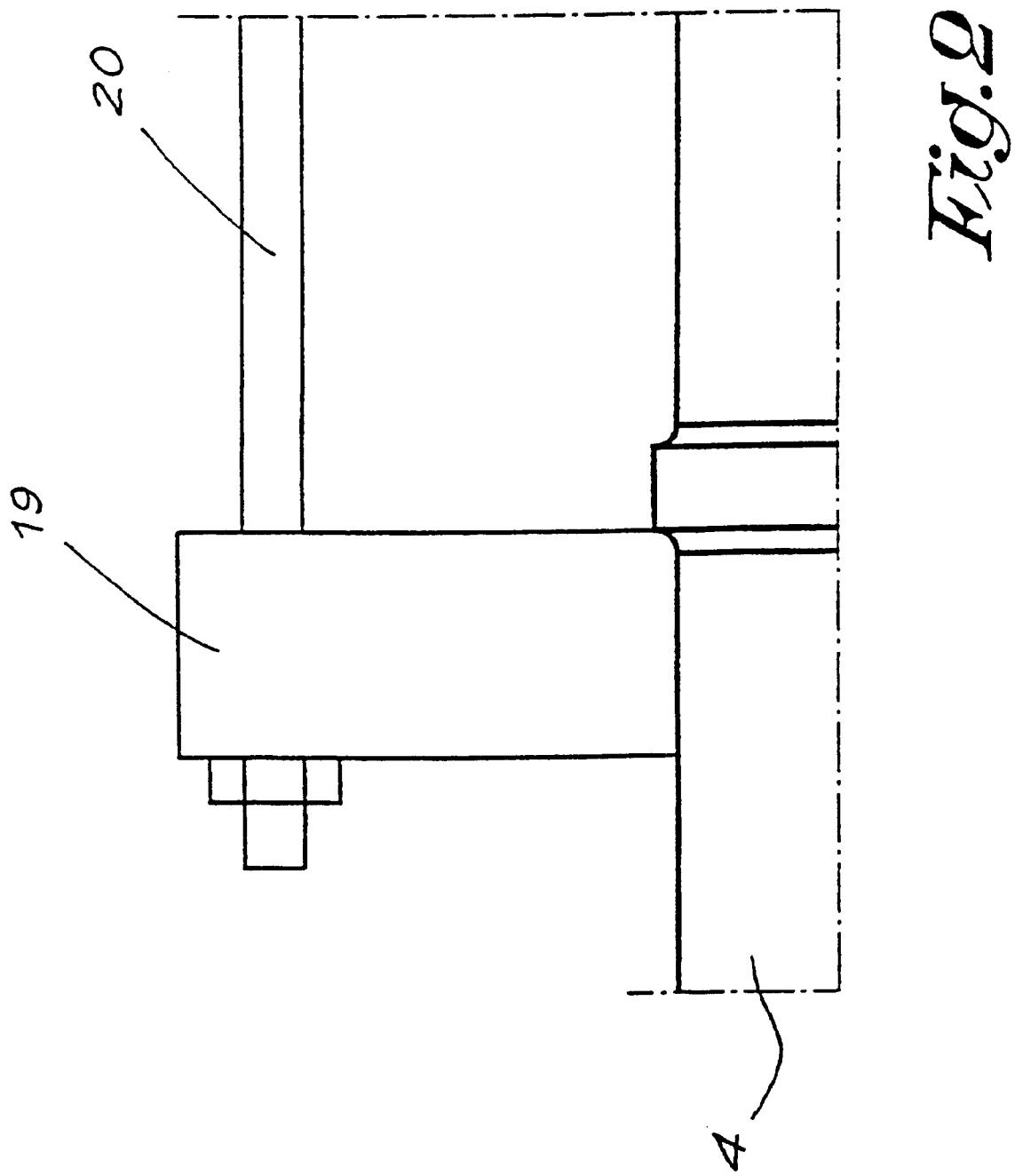

METHOD AND DEVICE FOR WELDING ELONGATED ELEMENTS

Figure 1:
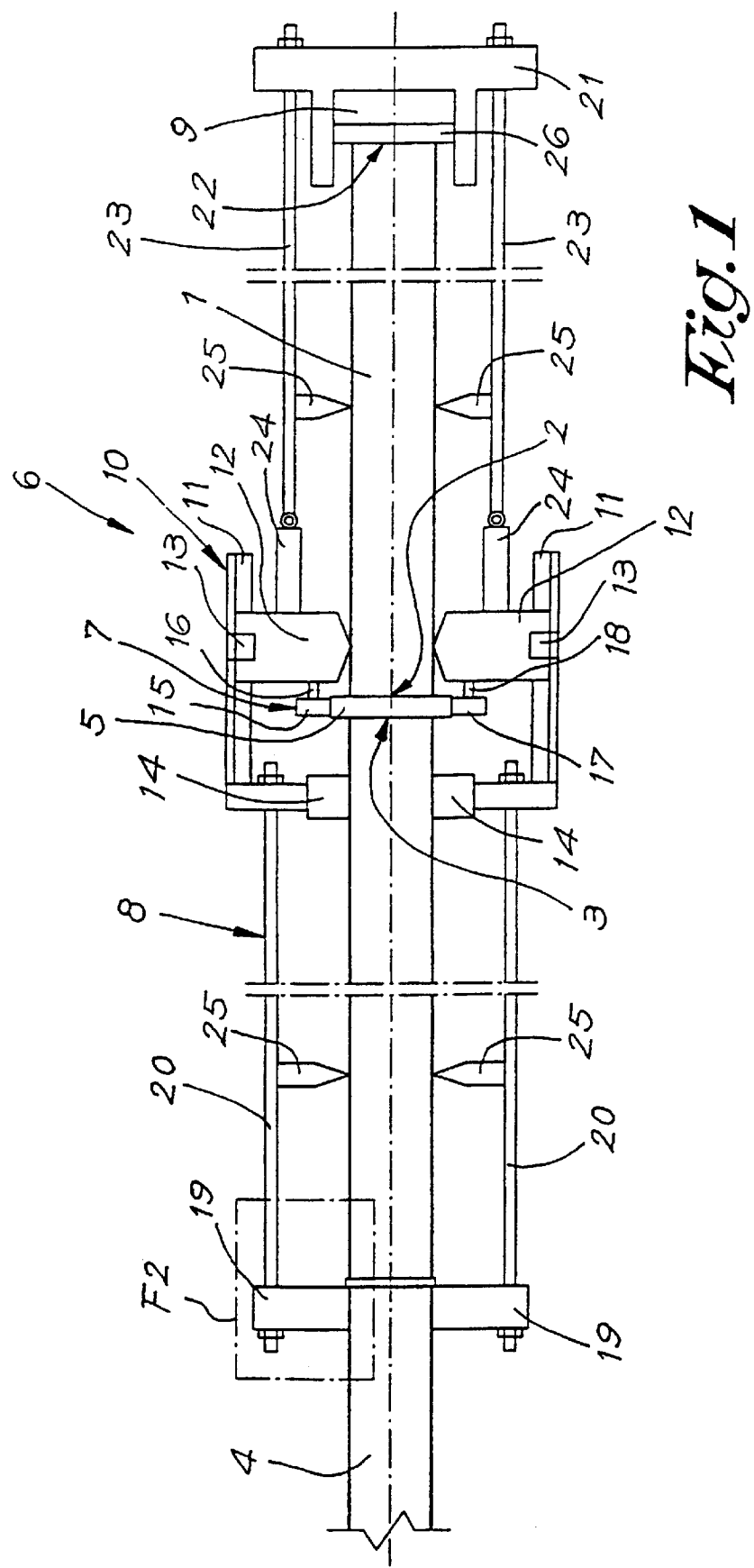

The present invention concerns a method for welding the far ends of elongated elements together, such as pipes, rails, rods, iron sections, etc. by means of friction welding, whereby the above-mentioned far ends are heated up to forging temperature by rotating a ring clamped in between them.

In order to weld such elongated elements, the same techniques as for welding plates have long been used, namely techniques whereby filamentary material is added to the weld.

Not only are such welds very difficult to apply for the welder, as he has to weld in very awkward positions, but there may also arise faults and distortions in the welds, which results in risks of leaks or cracks, especially in the case of pipelines.

That is why it is already known for pipelines to connect the far ends of the elements by means of friction welding.

In the case of friction welding, the elements to be welded are rotated about their axes, one in relation to the other, while these elements are pushed one against the other, so that the elements situated next to one another heat up thanks to the friction and melt together.

As only the surfaces to be welded are heated, this is a very efficient technique, but ordinary friction welding cannot be applied in case of long elements such as the pipes of a pipeline, since these elements cannot be rotated about their axes in practice.

However, in order to apply friction welding, use is made of a ring in the case of pipelines which is put in between two pipes to be welded together, and it is rotated until the ring and the far ends of the pipes reach the forging temperature.

In such a known method, use is made of a conical ring which is rotated and upon which is exerted a radial pressure, while the pipes are being held tight.

The shape of the far ends of the pipes is complementary to the conical ring.

As the force with which the ring is radially pushed against the far ends of the pipes is usually not sufficiently large, the quality of the weld is of ten bad.

DATABASE WPI Section Ch, Week 197921 Derwent Publications Ltd., London, GB; Class M23, AN 1979-40161B XP002131895 discloses a method for welding the extremities of two elongated elements together by means of friction, whereby the above-mentioned extremities are heated up to forging temperature by rotating a ring clamped in between them by means of hydrocilinders. As soon as the forging temperature is reached, the pressure is increased and the elements are pushed towards one another with a great force.

The invention aims to remedy the above-mentioned and other disadvantages, and to of for a method far welding elongated elements whereby a weld of excellent quality is obtained.

This aim is reached according to the invention by a method for welding the ends of two elongated elements together by means of friction welding, whereby the above-mentioned ends are heated up to forging temperature by rotating a ring clamped in between them, and, as soon as the forging temperature is reached, the elements are pushed towards one another with great force, which method is characterised in that a flat ring is provided between the ends, the elements are axially drawn towards each other and these elements are pushed towards one another with great force by at least one stroke exerting at least once a sudden axial dynamic force.

This exertion of a dynamic force may consist of one or several pneumatic hammer strokes, but it can also be obtained by means of an explosion.

Preferably, the elongated elements are entirely drawn towards one another in their longitudinal direction.

The invention also concerns a device which is particularly suitable for applying the above-described method.

Consequently, the invention also concerns a device for welding two elongated elements together, by means of friction welding according to the above-mentioned method, whereby this device contains driving means to rotate a ring, drawing means to draw the elongated elements together, and means to exert axially a stroke or sudden dynamic force, preferably consisting of an explosion room or a mechanical hammer.

In order to better explain the characteristics of the invention, the following preferred embodiments of a method and a device according to the invention are described as an example only without being limitative in any way, with reference to the accompanying drawings, in which:

FIG. 1 schematically represents a view of a pipe line while the method according to the invention is being applied;

FIG. 2 represents the part which is indicated in FIG. 1 by F2 to a larger scale.

In order to weld an elongated element according to the invention, which in the given example consists of a pipe 1, with its far end 2 to the free end 3 of a second elongated element, consisting of a part 4 of a pipeline which has already been formed, which consists of similar pipes, a flat ring 5 is provided between the far ends 2 and 3, these far ends 2 and 3 are axially drawn together, while the ring 5 is rotated until this ring 5 and the above-mentioned far ends 2 and 3 reach the forging temperature, after which, by means of dynamic forces caused by an explosion, the far ends 2 and 3 are pushed towards one another with great force, in particular as the pipe 1 is pushed towards the part 4 of the pipeline with great force, thanks to the explosion.

Use is hereby made of a device 6, as represented in the figures, which mainly consists of drive means 7 to rotate the ring 5, drawing means 8 to draw the part 4 and the pipe 1 together, and an explosion room 9.

The device 6 contains centring means 10 to centre the pipe 1 in relation to the part 4.

These centring means 10 are part of the drawing means 8 and consist of a slideway 11 over which a centring piece 12 is provided, such that it can slide and such that it can be locked in any position whatsoever by means of a locking mechanism 13.

The slideway 11 can be clamped on the part 4 by means of a clamping mechanism 14.

The above-mentioned drive means 7 are mounted on one of the centring pieces 12 and consist of a roller 15 which, via a shaft 16 which is parallel to the pipe 1, is driven by a motor which is not represented in FIG. 1, and which is provided in the above-mentioned centring piece 12.

In order to prevent the roller 15 from slipping, the outer surface of the roller 15 and/or of the ring 5 can be roughened, for example it can be ridged or knurled.

Also on the other centring pieces 12 is provided a roller 17 via a shaft 18, but this roller 17 can loosely revolve.

By means of the rollers 15 and 17, the ring 5 is centred simultaneously with the pipe 1.

Besides the centring means 10, the drawing means 8 contain a second clamping mechanism 19 which can be clamped around the part 4 and which is connected to the clamping mechanism 14 by means of tie rods 20.

Further, the drawing means 8 contain a yoke 21 to be provided against the free end 22 of the pipe 1 by means of the above-mentioned explosion room 9. This yoke 21 is fixed to the centring pieces 12 by means of tie rods 23 and screw jacks 24.

In order to prevent the tie rods 20 and 23 from bending, preventer stays 25 are provided on the latter which rest against the part 4 of the pipe 1.

The explosion room 9 is provided with a mobile wall 26 and a filler opening which can be sealed, and which is not represented in the figures.

Finally, thermocouples which are not represented in the figures are provided on the far end 2 of the pipe 1 and on the far end 3 of the part 4 of the pipeline.

The pipe 1 is welded to the part 4 with the device 6 in a very simple manner and as follows:

The clamping mechanisms 14 and 19 which are connected by the tie rods 20 are erected around a pipeline, such that the driving means 7 and the centring pieces 12 of the centring means 10 are situated just past the far end 3, after which these clamping mechanisms 14 and 19 are clamped.

The length of the tie rods 20 is selected such that the clamping mechanism 19 is situated right on the side of a weld which has already been formed and which is turned away from the far end 3 when the clamping mechanism 14 is being clamped at the height of the far end 3 of the part 4.

A ring 5 is placed between the rollers 15–17 against the far end 3, and a pipe 1 is connected to this ring 5.

Next, the yoke 21, together with the explosion room 9, is put against the free end 22 of the pipe 1, and the tie rods 23, with an adjusted length, are provided between the yoke 21 and the screw jacks 24 fixed to the centring pieces 12.

The ring 5 and the pipe 1 are positioned and centred very precisely by moving the centring pieces 12 over the slideway 11 towards the part 4, and by subsequently locking the locking mechanisms 13.

In order to subsequently draw the part 4 and the pipe 1 towards one another, the screw jacks 24 are drawn in, and the set-up is ready to start the actual welding.

The clamping mechanism 19 cannot shift hereby, since it catches behind a weld.

In a first stage, the ring 5 is slowly rotated by the driving means 7.

Thanks to the friction, the far ends 2 and 3 to be welded and the intermediate ring 5 are pre-heated.

In a second stage, the speed of the ring 5 is increased until, by further friction, the forging temperature is reached, which is 1900° C. for steel pipes.

Said forging temperature is detected by means of the above-mentioned thermocouples.

When the forging temperature is reached, an explosive load in the explosion room 9 is made to explode, so that the mobile wall 26 knocks the pipe 1 with a large, sudden axial force against the ring 5, and this ring 5 in turn knocks against the far end 3 of the part 4 of the pipeline.

After it has cooled, the ring 5 forms a weld which connects the part 4 to the pipe 1.

This method can be repeated on the far end 22 with a following ring 5 and a following pipe 1.

The dynamic forces with which the pipe 1 and the part 4 of the pipeline are pushed towards one another with great force, do not necessarily need to be obtained by an explosion.

According to another embodiment, the element formed by said pipe 1 and the element formed by said part 4 are pushed towards one another by means of one or several pneumatic hammer strokes.

In this case, the explosion room 9 in the device is replaced by a pneumatic hammer which may be of a construction known as such.

The invention is by no means limited to the above-described embodiment represented in the accompanying drawings; on the contrary, such a method and device can be made in all sorts of variants while still remaining within the scope of the invention.

Thus, the pipe in the method, as illustrated in the figures, is a straight pipe. According to another method, also a buckled or bent pipe can be welded.

The method and the device are then analogous to those described above, with this difference that a tangential force has to be applied on the free end 22 of the pipe 1 in order to obtain an axial force on the end to be welded, and thus has to be drawn according to the entire longitudinal direction of said pipe 1 by means of tie rods consisting of several pieces which are connected to one another and which form an angle in relation to one another, extending along the bent or welded pipe 1.

What is claimed is:

1. A method for friction welding first and second elongated elements having weldable ends, the method comprising the steps of:

axially aligning the two elongated elements with the weldable ends adjacent to one another;

clamping the weldable ends together with a rotatable flat ring;

rotating the ring relative to the two elongated elements to frictionally generate heat at the weldable ends to a suitable forging temperature; and pressing said elongated elements together at said weldable ends with forge welding pressure by at least one stroke exerting a sudden axial dynamic force when the weldable ends have reached the suitable forging temperature, said dynamic force generated from at least one pneumatic hammer stroke.

2. The method according to claim 1, wherein the elongated elements are entirely drawn towards one another in their longitudinal direction.

3. The method according to claim 1, wherein the weldable ends and the ring are first heated by the rotation of the ring, the ring being rotated at an increased rate until the weldable ends and the ring reach the suitable forging temperature.

4. The method according to claim 1, wherein the weldable ends of the elongated elements are drawn towards one another by a drawing device including a clamping mechanism clamped on the first elongated element, and a yoke provided against a non-welded end opposite the weldable end of the second elongated element.

5. The method according to claim 4, wherein the clamping mechanism is clamped to a welded end portion opposite to the weldable end of the first elongated element.

6. The method according to claim 4, wherein the elongated elements are drawn towards one another by screw jacks of the drawing device.

7. A method for welding two elongated elements having weldable ends by friction welding, the method comprising the steps of:

axially aligning the two elongated elements with the weldable ends adjacent to one another;

clamping the weldable ends together with a rotatable flat ring;

rotating the ring relative to the two elongated elements to frictionally generate heat at the weldable ends to a suitable forging temperature; and pressing said elongated elements together at said weldable ends with forge welding pressure by at least one stroke exerting a sudden axial dynamic force when the weldable ends have reached the suitable forging temperature, said dynamic force generated by an explosion.

8. The method according to claim 7, wherein the elongated elements are entirely drawn towards one another in their longitudinal direction.

9. The method according to claim 7, wherein the weldable ends and the ring are first heated by the rotation of the ring, the ring being rotated at an increased rate until the weldable ends and the ring reach the suitable forging temperature.

10. The method according to claim 7, wherein the weldable ends of the elongated elements are drawn towards one another by a drawing device including a clamping mechanism clamped on the first elongated element, and a yoke provided against a non-welded end opposite to the weldable end of the second elongated element.

11. The method according to claim 10, wherein the clamping mechanism is clamped to a welded end portion opposite to the weldable end of the first elongated element.

12. The method according to claim 10, wherein the elongated elements are drawn towards one another by screw jacks of the drawing device.

13. A device for welding first and second elongated elements having weldable ends by friction welding, said device comprising:

a ring configured to clamp the weldable ends adjacent to one another and rotate relative to the two elongated elements;

a driving device arranged to rotate the ring;

a drawing device arranged to draw the elongated elements axially towards one another; and an explosion device arranged to exert at least one stroke of a sudden axial dynamic force with sufficient pressure to forge weld the weldable ends of the elongated elements together.

14. The device according to claim 13, wherein the drawing device includes at least one clamping mechanism arranged on one end thereof and a yoke arranged on the other end, the explosion device located against one side of the yoke.

15. The device according to claim 13, further comprising a centering device having centering pieces each arranged to move over a slideway and configured to be locked in place by a locking mechanism.

16. The device according to claim 15, wherein the drawing device includes screw jacks connected to the centering pieces.

17. A device for welding first and second elongated elements having weldable ends by friction welding, said device comprising:

a ring configured to clamp the weldable ends adjacent to one another and rotate relative to the two elongated elements;

a driving device arranged to rotate the ring;

a drawing device arranged to draw the elongated elements axially towards one another; and a pneumatic hammer arranged to exert at least one stroke of a sudden axial dynamic force with sufficient pressure to forge weld the weldable ends of the elongated elements together.

18. The device according to claim 17, further comprising a centering device having centering pieces each arranged to move over a slideway and configured to be locked in place by a locking mechanism.

19. The device according to claim 18, wherein the drawing device includes screw jacks connected to the centering pieces.

* * * * *